UNITED STATES PATENT OFFICE.

EMIL MEYER, OF ELBERFELD, GERMANY, ASSIGNOR TO THE FARBENFABRIKEN, VORMALS FR. BAYER & CO., OF SAME PLACE.

BLUE DYE.

SPECIFICATION forming part of Letters Patent No. 499,243, dated June 13, 1893.

Application filed February 18, 1893. Serial No. 462,892. (Specimens.) Patented in France August 4, 1892, No. 223,450, and in Italy, November 28, 1892, XXVII, 33,050, LXV, 52.

*To all whom it may concern:*

Be it known that I, EMIL MEYER, chemist, and assignor to the FARBENFABRIKEN, VORMALS FR. BAYER & CO., of Elberfeld, a subject of the Emperor of Germany, residing at Elberfeld, Prussia, Germany, have invented a new and useful Improvement in the Manufacture of Coloring-Matters, (for which the FARBENFABRIKEN, VORMALS FR. BAYER & CO., has obtained Letters Patent in the following countries: France, dated August 4, 1892, No. 223,450, and Italy, dated November 28, 1892, Vol. XXVII, No. 33,050, and Vol. LXV, No. 52;) and I do hereby declare the following to be a full and exact description of the invention.

My invention relates to the production of a blue coloring-matter, suitable for dyeing and printing purposes, by the action of one molecular proportion of tetraalkyldiamidobenzhydrol on one molecular proportion of products known in commerce as new-blue and derived from beta naphthol and the salts of nitrosodialkylaniline.

In carrying out my invention practically I proceed as follows: 2.5 kilos, by weight, of new blue R described in the *Berichte der Deutschen Chemischen Gesellschaft*, XXII, 2065 (Jahr, 1879), (the product from nitrosodimethylaniline and beta naphthol) are dissolved in twenty-five kilos, by weight, of alcohol, and 2.20 kilos, by weight, of tetramethyldiamidobenzhydrol are added to the above solution. After the tetramethyldiamidobenzhydrol has dissolved, the solution is heated at from 60° to 85° centigrade for about twelve hours. After this time the action of the two components employed is completed. The resulting liquid is poured into fifty kilos, by weight, of water, and the base of the formed dye-stuff is precipitated by means of sodium carbonate. The precipitate is filtered off, washed out, carefully mixed with water and such a quantity of hydrochloric acid as corresponds to two molecular proportions of this acid for one molecular proportion of the base. The mixture is stirred until the whole has dissolved. The liquid is filtered and mixed with a concentrated solution of zinc chlorid, in order to produce the double salt of the coloring-matter with zinc chlorid. This double salt is isolated by salting out, filtering off, pressing and drying most practically at about from 40° to 50° centigrade. My new dye-stuff thus obtained from equal molecular proportions of tetramethyldiamidobenzhydrol and new blue R forms after drying and pulverizing a dark bluish-violet powder, easily soluble in water and alcohol with blue color, insoluble in ammonia, sodium carbonate and soda-lye. It dissolves in diluted or concentrated sulfuric and hydrochloric acid with blue color. On adding ammonia, sodium carbonate or soda-lye to its watery solutions the base of the dye-stuff is precipitated. When its watery solutions are mixed with hydrochloric or sulfuric acid, the color is not changed. It dissolves in concentrated sulfuric acid (of 66° Baumé) with greenish-blue color, which changes into blue when the sulfuric acid solution is allowed to stand in the air or is mixed with ice-water. The coloring-matter produces blue shades when dyed on cotton prepared with tannic acid or the like, and yields the same shades when employed for printing purposes.

Having thus described my invention, I claim and desire to secure by Letters Patent—

1. The coloring-matter resulting by the action of tetraalkyldiamidobenzhydrol on new blue R and which forms after drying and pulverizing a bluish-violet powder, easily soluble in water and alcohol with blue color, insoluble in ammonia, sodium carbonate and soda-lye; it dissolves in concentrated sulfuric acid (of 66° Baumé) with greenish-blue color, changing into blue when the sulfuric acid solution is allowed to stand in the air or is mixed with ice-water.

2. The process of producing new coloring-matter by acting with equal molecular proportions of tetraalkyldiamidobenzhydrol on the products derived from nitrosodialkylanilines and beta naphthol.

In testimony whereof I have signed my name in the presence of two subscribing witnesses.

EMIL MEYER.

Witnesses:
   WM. ESSENWEIN,
   RUDOLPH FRICKE.